3,546,141
PHOSPHORUS-NITROGEN POLYMERS AND PROCESS

Robert M. Washburn, Whittier, and Dennis W. Karle, Los Angeles, Calif., assignors, by mesne assignments, to McDonnell Douglas Corporation, Santa Monica, Calif., a corporation of Maryland
No Drawing. Filed Aug. 8, 1966, Ser. No. 570,774
Int. Cl. C08g 25/00, 33/16
U.S. Cl. 260—2      19 Claims

ABSTRACT OF THE DISCLOSURE

A novel phosphorous-nitrogen polymers derived from (A) a dialkylamino phosphorus amide or thiophosphorus amide, e.g., bis-dimethylaminophenylphosphine oxide or hexamethylphosphoroamide, and (B) an aryl- or alkyl-polyamine, e.g., p-phenylenediamine, ethylenediamine, 1,3,5-triaminobenzene, and characterized by their thermal, hydrolytic and oxidative stability. A mixture of compound (A) and compound (B) in a molar ratio of at least 1 to 1 respectively are heated, e.g., at substantially reflux temperature, until gelling or solidification of the mixture occurs. Polymer products obtained, for example, can be used to impregnate fibrous material, e.g., fiber glass, to form laminates.

---

This invention relates to a novel class of phosphorus-nitrogen polymers, and is particularly concerned with the production of organophosphorus nitrogen-containing polymers which are highly stable and have a wide variety of useful applications, and to procedure for the preparation of such polymers.

Many types of organophosphorus compounds have been prepared. In general, the organophosphorus polymers known heretofore fall into three general classes: (a) phosphonitrilics, (b) phosphorus amides, and (c) phosphorus esters. These classes have all had some property which prevented their use. For example, the phosphonitrilics are hydrolytically unstable, and the polyphosphorus amides and esters generally decompose at temperatures below 250° C. Also, polyphosphorus amides which have been prepared heretofore, were generally insoluble and could not be molded into useful articles.

It is an object of this invention to provide polymeric organophosphorus materials which are soluble and moldable to form useful articles. Another object is to provide polymeric materials having a wide range of thermal, hydrolytic, oxidative and radiation stability. A still further object is to provide polymeric materials having improved physical and mechanical properties, rendering them useful as laminating resins, high temperature adhesives, elastomers, ablatives, sealants, flame retardants and radiation resistant coatings.

The above objects are achieved according to the invention by the provision of a novel class of organophosphorus nitrogen polymers. Such polymeric products are produced by reacting a polyamine, preferably an arylpolyamine, and a poly-(alkylamino) phosphorus amide or thiophosphorus amide.

More specifically, it has been found that polyamines, particularly arylpolyamines, undergo a transamidative reaction with a dialkylaminophosphorus amide, including N,N-dialkylphosphorus amides and N,N-dialkylthiophosphorus amides, upon heating, to produce a series of new and useful organophosphorus polymers. The formation of the polymeric materials can be represented by the general equation below:

(1) $(H_2N)_x$—B—$NH_2$ + $[(RR')N]_zP(X)(Ar)_y$ →
Polymer + RR'NH where B is an arylene group such as M- and p-phenylene,

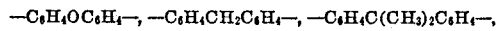

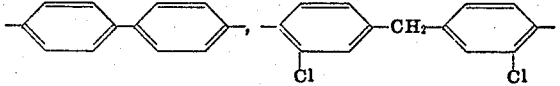

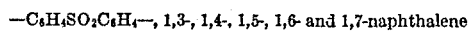

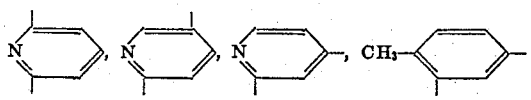

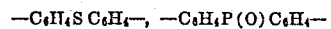

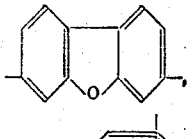 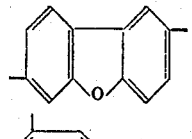

1,3,5-, 1,3,6-, 1,3,7-, 1,4,6-naphthalene, and the like; or B is a lower alkylene group containing from 2 to about 6 carbon atoms such as —$(CH_2)_2$—, —$(CH_2)_3$—, —$CH(CH_3)CH_2$—, —$(CH_2)_4$—, —$C(CH_3)_2CH_2$—, cyclopentylene, cyclohexylene, —$CH_2CF_2$—, —$(CF_2)_2$— and the like; Ar is an aryl group such as $C_6H_5$—, $ClC_6H_4$—, $BrC_6H_4$—, $IC_6H_4$—, $Cl_2C_6H_3$—, $Br_2C_6H_3$—, $Cl_3C_6H_2$—, $CH_3OC_6H_4$—, $CH_3C_6H_4$—, $(CH_3)_2C_6H_3$—, $O_2NC_6H_4$—, $FC_6H_4$—, $F_2C_6H_3$—, $F_3C_6H_2$—, $F_4C_6H$—, $F_5C_6$—, $C_6H_5OC_6H_4$—, $C_6H_4N$—, naphthyl, methylnaphthyl, anthranyl, and the like; R and R' are each a lower alkyl group of from 1 to about 6 carbon atoms such as $CH_3$—, $C_2H_5$, n-$C_3H_7$—, i-$C_3H_7$—, $C_4H_9$—, cyclopentyl, cyclohexyl, and the like, and R and R' can be the same or different; X is oxygen or sulfur; and $x$ is an integer from 1 to 2, $y$ is an integer from 0 to 1, and $z = 3-y$. Preferably, B is arylene, X is oxygen, $x = 1$, $y = 0$ and $z = 3$.

The method of preparing the polymers according to the above equation is particularly advantageous because the by-product RR'NH formed concurrently with the polymer is either a gas or a liquid and can be readily removed from the polymer.

Examples of specific polyamines which can be employed include 4,4'-methylenedianiline, oxydianiline, 4,4'-sulfonyldianiline, p-phenylenediamine, m-phenylenediamine, methylene bis-o-chloroaniline, 2,4-toluenediamine, 1,3-naphthalenediamine, 2,5-diaminopyridine, ethylenediamine, propylenediamine and cyclopentylenediamine; 1,3,5-triaminobenzene; 1,3,5-, 1,3,6-, and 1,3,7-triaminonaphthalene, 2,4,6-triaminotoluene, and 2,4,6-triamino-s-triazine. The diamines are the preferred polyamines.

The polyamines defined and illustrated above are well known compounds and are produced by processes well known in the art.

If desired, mixed polyamines can be employed in Equation 1 above. Thus, for example, polymers can be obtained according to the invention from a mixture of m-phenylenediamine and p-phenylene diamine with a phosphorus amide.

General classes of the phosphorus amide compounds will will be herein designated as N,N-dialkylphosphorus amides, N,N-dialkylthiophosphorus amides, etc. Specific phosphorus compounds will be named herein as derivatives of phosphine oxides or sulfides, and in a few cases, trivial names have been retained. Examples of N,N-dialkylphosphorus amides and N,N-dialkylthiophosphorus amides, including typical nomenclature used, are as follows:

| | |
|---|---|
| (1) [(CH₃)₂N]₃P=O | Hexamethylphosphoramide. |
| (2) [(CH₃)₂N]₃P=S | Hexamethylthiophosphoramide. |
| (3) [(C₂H₅)₂N]₃P=O | Hexaethylphorphoramide. |
| (4) [(C₂H₅)₂N]₃P=S | Hexaethylthiophorphoramide. |
| (5) [(CH₃)₂N]₂C₆H₅P=O | bis-(Dimethylamino)phenylphosphine oxide. |
| (6) [(CH₃)₂N]₂C₆H₅P=S | bis-(Dimethylamino)phenylphosphine sulfide. |
| (7) [(C₃H₇)₂N]₃P=O | tris-(Dipropylamino)phosphine oxide. |
| (8) [(CH₃)(C₂H₅)N]₃P=O | tris-(Ethylmethylamino)phosphine oxide. |
| (9) [(CH₃)(C₂H₅)N]₂C₆H₅P=O | bis-(Ethylmethylamino)phenylphosphine oxide. |
| (10) [(CH₃)(C₂H₅)N]₃P=S | tris-(Ethylmethylamino)phosphine sulfide. |
| (11) [(C₂H₅)₂N]₂CH₃C₆H₄P=O | bis-(Diethylamino)tolylphosphine oxide. |
| (12) [(CH₃)₂N]₂C₁₀H₇P=O | bis-(Dimethylamino)naphthylphosphine oxide. |
| (13) [(CH₃)₂N]₂ClC₆H₄P=S | bis-(Dimethylamino)chlorophenylphosphine sulfide. |
| (14) [(CH₃)(C₃H₇)N]₂CH₃OC₆H₄P=O | bis-(Methylpropylamino)methoxyphenylphosphine oxide. |

The phosphorus amides are generally prepared by reaction of a phosphorus oxychloride with the appropriate secondary amine. Thus, for example, the preparation of hexaethylphosphoramide can be carried out as follows:

EXAMPLE A

About 31 g. of freshly distilled phosphorus oxychloride in 50 ml. of chloroform is added drop-wise with stirring to about 87 g. of diethylamine in 300 ml. of chloroform under a nitrogen atmosphere. The reaction mixture is maintained at a temperature below —25° during the addition. After the addition is complete, the reaction mixture is allowed to warm to room temperature with stirring and is then stirred and heated under reflux for 2 hours. The reaction mixture is then allowed to stand for about 10 to 12 hours and then extracted with water. The chloroform phase is evaporated and the residue is distilled at reduced pressure. The product is then taken up in ether, extracted with water, dried over magnesium sulfate and distilled at reduced pressure, the resulting product having a boiling point of 88 to 89° C. at 0.25 mm.

The thiophosphorus amides are generally more soluble in organic solvents and less stable than the analogous phosphorus-oxygen compounds. The thiophosphorus amides are generally prepared by reacting thiophosphoryl chloride with the appropriate secondary amine, the reaction generally being carried out in nonreactive solvents such as benzene, chloroform, ether, and the like. Thus, the preparation of hexamethylthiophosphoramide is noted below.

EXAMPLE B

Dimethylamine is bubbled into a solution of about 80 g. of thiophosphoryl chloride in 1500 ml. of anhydrous ether with stirring. The heat of reaction causes the mixture to reflux. The addition of dimethylamine is continued until the temperature starts to drop. After standing about 12 hours, the dimethylamine hydrochloride is removed by filtration and the remaining ether solution is evaporated. The remaining material is distilled and dried and the resulting product has a boiling point of 61.5° C. to 66° C. at 1.2 mm. pressure.

The bis-(dialkylamino)aryl phosphorus amides are generally prepared by the reaction of the appropriate dichloroarylphosphine oxides with the appropriate secondary amine. For example, bis-dimethylaminophenyl phosphine oxide is prepared in the following manner.

EXAMPLE C

Dimethylamine is bubbled into a solution of 39 g. dichlorophenylphosphine oxide in one liter of ether at room temperature. Dimethylammonium chloride precipitates and is removed by filtration. The ether is evaporated from the resulting filtrate leaving a white solid which is recrystallized by taking it up in boiling hexane and adding benzene to clear the turbidity. Following a second crystallization from hexane-benzene, the resulting product has a melting point of 84 to 86° C.

The bis-(dialkylamino)arylthiophosphorus amides are generally prepared by reacting the appropriate dichloroarylphosphine sulfide with the appropriate secondary amine. Thus, for example, bis-(dimethylamino)phenylphosphine sulfide is prepared as follows:

EXAMPLE D

Dimethylamine is bubbled into a solution of 53 g. of dichlorophenylphosphine sulfide in 750 ml. of anhydrous ether with stirring. During the addition, the solution begins to reflux spontaneously and the addition of dimethylamine is continued until the solution stops refluxing. The precipitated dimethylaminehydrochloride is collected, washed with ether, and dried. The ethereal solution is evaporated to give an oil which is taken up in ether, washed with water and dried over sodium sulfate. The ether is removed and the residue distilled at reduced pressure to give an oily solid which is taken up in n-hexane and crystallized under nitrogen at low temperature to give a product having a melting point of 47 to 48° C.

In carrying out the reaction between the polyamine and the phosphorus amide according to the invention, the reactants are heated usually to about the reflux temperature, and heating is generally continued at the reflux temperature to enable the reaction to proceed at a relatively rapid rate. Although the reaction can be initiated and can proceed at temperatures substantially below the reflux temperature, polymerization becomes prohibitively slow of the reaction is continued at temperatures subsantially below reflux. However, in certain instances, as for example, when employing hexaethylphosphoramide as the amide reactant, one can proceed at temperatures at about 230° C., even though reflux temperature is of the order of say 300° C. It has been found that temperatures of heating for producing relatively rapid polymerization are generally not substantially below 190° C. and usually not above about 300° C., generally between about 200 to 300° C. and usually between about 200 and 250° C.

The reflux temperature of the reaction mixture and the temperature at which the reaction mixture is maintained during the course of the reaction depends not only upon the chemical composition of the two components, that is, the polyamine and the phosphorus amide, but also upon the ratio of these reactants. Usually, the phosphorus amide is employed for molar excess with respect to the polyamine. Thus, for example, the molar ratio of phosphorus amide to polyamine can be as low as 1 to 1, but can be as great as 100 to 1. The excess of phosphorus amide employed functions as solvent for the reaction. Thus, while it is desirable to employ a sufficient excess of the phosphorus amide to thus function as solvent, it is desirable to limit the amount of excess phosphorus amide so employed in order to reduce the amount of unreacted phosphorus amide in the final reaction mixture and which must be removed therefrom. Thus, ordinarily there is employed a molar ratio of phosphorus amide to polyamine of at least 1 to 1, and generally ranging from about 2 to 1 to about 20 to 1.

In preferred practice, the polymerization reaction between the polyamine and the phosphorus amide component is carried out under an atmosphere of an inert gas such as nitrogen, argon, and the like. Although the use of an inert gas blanket is not necessary, it has been found desirable to prevent hydrolysis and/or oxidation of the starting materials and the polymeric product by air during the course of the reaction.

As previously noted, utilization of an excess of the phosphorus amide component is practiced so that such excess amide can function as solvent. However, if desired, and particularly where the molar ratio of the phosphorus amide to the polyamine is relatively low, an extraneous solvent can be employed. For this purpose, it is preferred to employ high boiling solvents, for example, quinoline, N-methylpyrrolidone, diphenyl ether, and the like.

In carrying out the reaction, the reaction mixture is heated and preferably maintained substantially at reflux temperature for a period sufficient for the reaction mixture to gel or solidify. Such reaction period can range from as little as about ½ hour to about 72 hours. The time period for reaction will depend upon various factors, including the chemical composition of the polyamine and of the particular phosphorus amide component employed, the ratio of these reactants to each other, and the nature of the polymeric reaction product desired.

Upon completion of the reaction, the reaction mixture is cooled, generally to room temperature, and can be treated in any desired manner as, for example, by filtration, washing with solvents such as benzene or ether, and extraction, to obtain the desired polymeric product.

It will be recognized that a variety of polymeric structures can result from the above reaction depending on the structure of the phosphorus amide, the structure of the polyamine and from the reaction conditions. In some cases, the material derived from the polymerization reaction is a polymeric mixture which can be separated into soluble and insoluble fractions with N,N-dimethylformamide (DMF). Although such soluble fractions are of particular utility and hence are preferred, the insoluble fractions can also be employed to produce useful products. Analysis of elemental analytical data from the DMF soluble and DMF insoluble polymer fractions obtained indicates that the structure of the polymeric materials of the invention consists of a plurality of recurring 4-membered rings composed of alternating phosphorus and nitrogen atoms, such rings being joined by arylene or alkylene groups. An exemplary structure of such a polymeric product may be represented by the following general formula:

(2) 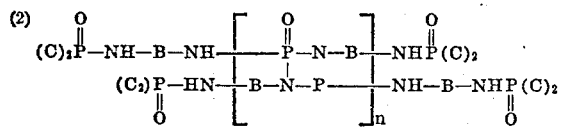

where B is an arylene or a lower alkylene group as defined above, C is a member selected from the class consisting of $(NH_2)_xB-NH-$ and $RR'N-$ groups, where $x$, $R$ and $R'$ have the values noted above, and where $n$ can be in the range from 2 to about 100. Thus, for example, $n$ is of the order of about 18 to 20 for the DMF insoluble fractions, and about 11 to 13 for the DMF soluble fractions for polymers derived from m- or p-phenylene diamine, and hexamethylphosphoramide. The end groups C of the polymeric structure shown above consist of a mixture of (a) $(NH_2)_xB-NH-$ groups (arylenediamine or alkylenediamine groups) and (b) $RR'N-$groups (dialkylamino groups). The end group structure depends on the starting materials and the reaction conditions. Generally, the polymeric product formed in the reaction illustrated by Equation 1 is in the form of a mixture of products represented by Formula 2 above.

However, as a consequence of the use of a dialkylaminophosphorus amide component as starting material, at least some of the end groups of the polymeric material are dialkylamino groups and hence are not readily hydrolyzable. Concurrent with polymer formation is the liberation of dialkylamine as indicated by Equation 1 above. Thus, for example, hexamethylphosphoramide, when functioning as the amide component, leads to the liberation of dimethylamine and the incorporation of some dimethylamino end groups C into the polymer matrix. Additionally, as a result of the use of dialkylaminophosphorus amides, the reactants do not contain groups that are subject to facile hydrolysis and which thus would undesirably hinder or prevent initiation of the polymerization or chain growth of the polymer. Therefore, it is a feature of the invention in preferred practice that neither the reactants, intermediates or final products contain readily hydrolyzable groups and hence none of the normal polymerization processes such as initiation, chain growth, cross-linking or further cure will be subjected to the deleterious effects of hydrolyzed moieties or pendent groups.

Although in preferred practice the polyamine component employed is a diamine, having a functionality of two, where the polyamine employed has a functionality greater than two, that is, where, for example, $x$ is 2 in Equation 1 above, and the polyamine is a triamine, e.g., triaminobenzene, this will result in the formation of cross-linked polymeric materials.

The polymeric products produced according to the invention have a wide variety of properties depending upon the particular polyamine and phosphorus amide components employed, and the extent to which the polymerization reaction is carried. Thus, for example, polymeric products of the invention of relatively low molecular weight, for example, certain polymeric products wherein $n$ in the formula above is up to about 13, are soluble in N,N-dimethylformamide and are thermoplastic, while polymeric products of higher molecular weight, for example, certain polymeric products wherein $n$ has a value of the order of about 18 or more, are insoluble in N,N-dimethylformamide and are hard non-melting, cross-linked materials. Certain of such thermoplastic materials are extremely gummy, elastomeric materials and have substantial elongation. Certain of the DMF soluble fractions of the polymeric products when dried are flaky, amorphous solids, whereas in most instances the dried DMF insoluble fractions are hard and brittle materials.

As previously noted, the polymeric products of the invention have utility as laminating resins, ablatives, high temperature adhesives, sealants, flame retardants, radiation resistant coatings and elastomers, and can also be molded.

The following are examples of practice of the invention:

EXAMPLE I

Polymer from hexamethylphosphoramide and 4,4'-methylenedianiline

A mixture of 4,4'-methylenedianiline (191.2 g.) and hexamethylphosphoramide (573 g.) is slowly heated to reflux under an atmosphere of nitrogen while being stirred. The reaction mixture is held at the reflux temperature (232±5° C.) for 40 minutes whereupon it gels and expands to fill the flask. After cooling to ambient temperature under an atmosphere of nitrogen, the reaction mixture is thoroughly triturated with boiling benzene (6 liters), collected by suction filtration and washed with boiling benzene (3 liters). The polymeric material is dried in vacuo to give a white powder (198 g.).

The white powder is stirred with hot N,N-dimethylformamide and then centrifuged. The supernatent liquid is separated and the process repeated on the N,N-dimethylformamide insoluble portion with additional N,N-dimethylformamide. The N,N-dimethylformamide solutions are combined, evaporated and dried at elevated temperatures up to about 100° C. in vacuo to give 121.5 g. of a flaky, brown solid. The N,N-dimethylformamide insoluble material is dried in vacuo at 100° C. to give 61.5 g. of a brown, hard, brittle solid.

EXAMPLES II TO VII

Polymers from hexamethylphosphoramide and other polyamines

In a similar manner as in Example I, polymers are prepared from hexamethylphosphoramide and the following polyamines: oxydianiline (Example II), 4,4'-sulonyldianiline (Example III), p-phenylenediamine (Example IV), m-phenylenediamine (Example V), methylene-bis-o-chloroaniline (Example VI) and 2,4-toluenediamine (Example VII).

Mixtures of hexamethylphosphoramide and the respective diamines in the molar ratios ranging from 3.2:1 to 7.1:1 are heated for a period ranging from about ½ hour to 22 hours under an atmosphere of nitrogen at substantially the reflux temperature. The reaction periods are determined by the time necessary for the reaction mixtures in each case to gel or solidify.

After cooling to room temperature, the procedure for obtaining the reaction product is substantially the same as described above in Example I. However, with respect to Examples VI and VII, a minor modification in this procedure consists in heating the benzene insoluble material to boiling in N,N-dimethylformamide and then filtering off any insoluble material. In the cases of 4,4'-sulfonyldianiline (Example III) the methylene-bis-o-chloroaniline (Example VI) no N,N-dimethylformamide insoluble fraction is obtained. The table below summarizes the reaction conditions and results for Examples II to VII.

| | Diamine, g. | HMPA, g. | Reaction period at reflux hr. | Temp. at reflux, °C. | Fraction | Yield of fraction, g. |
|---|---|---|---|---|---|---|
| Example: | | | | | | |
| II | +185 | 509 | 0.43 | 231±1 | S / I | 126.7 / 109.4 |
| III | 54.8 | 124 | 1.5 | 242±6 | S | 89.1 |
| IV | 101 | 513 | 1.0 | 230±3 | S / I | 44.8 / 106.1 |
| V | 101 | 513 | 1.5 | 234±1 | S / I | 50.1 / 86.5 |
| VI | 5.82 | 30.6 | 22 | 243±1 | S | 6.2 |
| VII | 5.32 | 30.6 | 4 | 237±3 | S / I | 7.38 / N.D. |

NOTE.—HMPA=hexamethylphosphoramide; S=N,N-dimethylformamide soluble; I=N,N-dimethylformamide insoluble; N.D.=Not determined.

The N,N-dimethylformamide soluble polymers are thermoplastic, whereas the N,N-dimethylformamide insoluble polymers are hard, intractable, non-melting, resilient materials. The polymers derived from oxydianiline, 4,4'-methylenedianiline, and 4,4'-sulfonyldianiline exhibit adhesive properties. The polymeric reaction products from oxydianiline (Example II) and 4,4'-methylenedianiline (Example I) are extremely gummy, elastomeric materials and exhibit elongations up to about 400%. The dried DMF soluble polymers or fractions derived from oxydianiline (Example II), 4,4'-methylenedianiline (Example I), methylene-bis-o-chloroaniline (Example VI), p- and m-phenylenediamine (Examples IV and V) are flaky amorphous solids, whereas those derived from 2,4-toluenediamine (Example VII) and 4,4'-sulfonyldianiline (Example III) are powdery solids. In some cases, the DMF insoluble polymers or fractions are very hard and brittle materials.

EXAMPLE VIII

Polymer from bis-(dimethylene)phenyl phosphine oxide and oxydianiline

A mixture of bis-(dimethylamino)phenyl phosphine oxide (5.3 g.) and oxydianiline (5.0 g.), that is, a 1 to 1 molar ratio of the amide to the amine, is heated for 4 hours under a nitrogen atmosphere in an oil bath maintained at 195° C. ±5°. After cooling to room temperature, the reaction mixture is washed with boiling benzene. The benzene is decanted and the benzene insoluble material is dried at 100% C. (0.2 mm. pressure) for 8 hours, yielding 2.60 g. of a dark blue polymeric material, which is soluble in acetone and in N,N-dimethylformamide, and exhibits some thermoplastic properties.

EXAMPLE IX

Polymer from hexaethylphosphoramide and 4,4'-methylenedianiline

A mixture of 4,4'-methylenedianiline (99 g.) and hexaethylphosphoramide (429 g.) is slowly heated to reflux under an atmosphere of nitrogen while being stirred. The reaction mixture is held at the reflux temperature (about 270° C.) for about 1 hour whereupon gellation occurs. After cooling to ambient temperature under an atmosphere of nitrogen, the reaction mixture is thoroughly triturated with boiling benzene (about 4 liters), collected by suction filtration and washed with boiling benzene (about 2 liters). The polymeric material is dried in vacuo over phosphorus pentoxide to give a white powder (about 80 g.).

The white powder is stirred with hot N,N-dimethylformamide and then centrifuged. After separation of the supernatant liquid, the extraction process is repeated on the insoluble portion with additional hot N,N-dimethylformamide. The N,N-dimethylformamide soluble materials are combined, evaporated and dried in vacuo to give about 45 g. of a light brown solid. The N,N-dimethylformamide insoluble material is dried in vacuo at about 100° C. to give about 30 g. of a brown, hard, brittle solid.

EXAMPLES X TO XIV

Polymers from hexamethylthiophosphoramide and polyamines

In a similar manner, as in Example I, hexamethylthiophosphoramide is reacted with the following diamines: p-phenylenediamine (Example X), m-phenylenediamine (Example XI), oxydianiline (Example XII), 4,4'-sulfonyldianiline (Example XIII) and 4,4'-methylenedianiline (Example XIV).

Mixtures of hexamethylthiophosphoramide and the respective diamines in the molar ratios 3.2 to 1 are heated for periods ranging from about ½ hour to 4 hours under an atmosphere of nitrogen at substantially the reflux temperature (about 250 to 270° C.). The reaction periods are determined by the time necessary for gellation to occur.

After cooling to ambient temperature, the procedure for obtaining the reaction product is substantially the same as described in Example I. The reaction conditions and results for Examples X to XIV are summarized in the table below.

| | Diamine, g. | HMTPA, g. | Reaction period, hr. | Fraction |
|---|---|---|---|---|
| Example: | | | | |
| X | 21.6 | 125 | 1.0 | S / I |
| XI | 21.6 | 125 | 2.0 | S / I |
| XII | 20 | 62.5 | 0.5 | S / I |
| XIII | 24.8 | 62.5 | 4.0 | S |
| XIV | 19.8 | 62.5 | 0.8 | S / I |

NOTE.—HMPTA=hexamethylthiophosphoramide; S=N,N-dimethylformamide soluble; I=N,N-dimethylformamide insoluble.

EXAMPLE XV

Polymer from bis-dimethylaminophenylphosphine sulfide and oxydianiline

A mixture of bis-dimethylaminophenylphosphine sulfide (about 11.4 g.) and oxydianiline (about 10 g.), that is, about a 1 to 1 molar ratio of the amide to amine, is heated for about 5 hours under a nitrogen atmosphere in an oil bath maintained at about 200° C. After cooling to room temperature, the reaction mixture is washed with boiling benzene. The benzene insoluble material is collected and dried at 100° C. (1.0 mm. pressure) for about 14 hours, yielding about 6 g. of polymeric material which is somewhat soluble in N,N-dimethylformamide.

EXAMPLE XVI

Polymer formation from hexamethylphosphoramide and a mixture of 4,4'-methylenedianiline and 4,4'-sulfonyldianiline In a similar manner, as in Example I, a mixture of hexamethylphosphoramide (about 573 g.), 4,4'-methylenedianiline (about 96 g.) and 4,4'-sulfonyldianiline (about 120 g.) is reacted for about 1 hour at substantially the reflux temperature (about 235° C.). The procedure for obtaining the reaction product is substantially the same as described in Example I. The product is separated on the basis of its solubility in N,N-dimethylformamide to give about 160 g. of soluble polymer and about 35 g. of insoluble polymer.

EXAMPLE XVII

Preparation of polymer from hexamethylphosphoramide and oxydianiline using diphenylether as solvent A mixture of oxydianiline (36.3 g.), hexamethylphosphoramide (100 g.) and disphenylether (82.4 g.) is heated to reflux temperature with stirring under an atmosphere of nitrogen. The reaction mixture is held at the reflux temperature (about 240° C.) for about 0.5 hour, whereupon the resulting dark brown gel is allowed to cool to ambient temperature. The reaction mixture is triturated thoroughly with boiling benzene, collected by suction filtration and washed with boiling benzene to give about 40.5 g. of polymeric material. The polymeric material is then treated in a manner similar to that described in Example I.

EXAMPLE XVIII

Other preparations of polymers from hexamethylphosphoramide and polyamines using several solvents In a similar manner, as in Example XVII, polymers are prepared from mixtures of hexamethylphosphoramide (about 100 g.), various solvents (about 100 g.) and the following diamines: oxydianiline, 4,4'-methylenedianiline and 4,4'-sulfonyldianiline. The table below summarizes the polymer preparation.

| Amine, g. | Solvent | Reaction temp., °C. | Reaction period, hr. |
|---|---|---|---|
| Oxydianiline, 36.3 | NMP | 210 | 1.5 |
|  | Q | 230 | 1.0 |
|  | DPE | 240 | 1.0 |
| 4,4'-methylenedianiline, 36.0 | Q | 235 | 1.0 |
|  | NMP | 210 | 1.5 |
| 4,4'-sulfonyldianiline, 45.2 | DPE | 242 | 4.5 |
|  | Q | 230 | 5.0 |

NOTE.—N-methylpyrrolidone; Q=quinoline; DPE=diphenyl ether.

EXAMPLE XIX

Preparation of glass cloth laminates

The dry polymer obtained from the N,N-dimethylformamide soluble fraction of Example I above is further dried in vacuo at 200° C. for 1 hour in 10 g. lots, and its softening point is determined. The polymer is then mixed with N,N-dimethylformamide to form a solution having a polymer content ranging from 25 to 40%. The resulting mixture is used to saturate high silicon fiber glass cloth with enough polymeric material to give an approximately 35% resin content after molding. The fabric is then dried at 200° C., excess resin removed, and pressed in a mold at low pressures (about 50 p.s.i.) and at temperatures 20° C. higher than the softening point of the polymer for 0.5 hr. After cooling, the mold is taken apart to obtain a 3-inch diameter, 4-ply fiber glass laminate of 0.081 inch thickness.

The laminate has a density of 1.6 g./cc. and has a resin content of 25%.

EXAMPLE XX

Preparation of carbon cloth laminate

In a manner similar to that described in Example XIX, the polymer obtained from the N-N-dimethylformamide soluble fraction of Example I is applied to carbon cloth. The saturated cloth is first fused in a mold at low pressure and at 280° C. for 10 minutes, and then rapidly heated in the mold to 400° C. under pressure. After maintaining the polymer saturated cloth at 400° C. for 7 minutes, the material is allowed to cool and the mold it taken apart to obtain a 1-inch diameter carbon cloth 6-ply laminate of 0.086 inch thickness.

The laminate has a density of 1.28 g./cc. and has a resin content of 39.9%. The laminate does not soften at 400° C.

EXAMPLE XXI

Preparation of carbon cloth laminate using an insoluble polymer

The N-N-dimethylformamide (DMF) insoluble polymer derived from 4,4'-methylenedianiline of Example I is mixed thoroughly with a solution of the DMF soluble polymer 4,4'-methylenedianiline of Example I. Using techniques similar to those described in Example XX, the mixture is applied to carbon cloth and molded to give a filled carbon cloth laminate.

EXAMPLE XXII

Preparation of moldings

The polymer obtained from the N,N-dimethylformamide soluble fraction of Example I is further dried and placed in a mold. The polymer (25.6 g.) is then subjected to low pressure (300 p.s.i.) at temperatures 20° C. higher than its softening point for 20 minutes. After cooling, the mold is separated to give a 3⅛ inch diameter disk of 0.165 inch thickness.

The material has a density of 1.23 g./cc. and has a thermal conductivity of 0.13 B.t.u./hr. ft.² ° F.

EXAMPLE XXIII

Use of polymer as an adhesive

A small sample of the 4,4'-sulfonyldianiline derived polymer of Example III plasticized with hexamethylphosphoramide, is spread on a set of glass slides. The glass slides are then heated with pressure. Upon cooling to ambient temperature, the glass slides are tightly bound together.

EXAMPLE XXIV

Adhesive properties of other polymers

A slight modification of the procedure of Example XXIII is used to bond glass slides together with the DMF soluble polymers derived from oxydianiline (Example II) and from 4,4'-methylenedianiline (Example I). Such modification consists of using the dry polymer without any plasticizer. The glass slides, after cooling, are bonded securely together.

From the foregoing, it is seen that the invention provides organophosphorus-nitrogen polymers which are hydrolytically and thermally stable, and which can be fractionated into preferred polymeric materials that are soluble in organic solvents such as N,N-dimethylformamide, N-methylpyrrolidone, and dimethylsulfoxide, and which are used as laminating resins, molding compounds, ablative materials, both with and without support, adhesives, sealants, radiation resistant coatings and elastomers, and as flame retardants. Such polymers can be prepared readily from available materials by a relatively simple procedure involving heating certain polyamine and phosphorus amide starting materials, according to the invention.

It will be understood that various modifications and adaptations of the invention can be made without departing from the spirit of the invention.

We claim:

1. The process for producing a hydrolytically stable organophosphorus-nitrogen polymer, which comprises heating at substantially reflux temperature a polyamine having the formula $$H_2N-B-NH_2$$

where B is arylene, and an organic phosphorus amide having the formula $$[(RR')N]_3P=O$$

where R and R' are each a lower alkyl of from 1 to about 6 carbon atoms, employing a molar ratio of said phosphorus amide to said polyamine ranging from about 1 to 1 to about 20 to 1, for a period sufficient to cause gelling or solidification of the reaction mixture, said reaction mixture being maintained at a temperature ranging from about 190 to about 300° C., for a period from about ½ hour to about 72 hours, and recovering a polymeric product from said reaction mixture.

2. The process as defined in claim 1, employing mixed polyamines.

3. The process as defined in claim 1, said polymeric product including at least a fraction which is soluble in N,N-dimethylformamide.

4. The process as defined in claim 1, said polymeric product including at least a fraction which is insoluble in N,N-dimethylformamide.

5. A process as defined in claim 1, wherein said polyamine is selected from the group consisting of p-phenylenediamine, m-phenylenediamine, 4,4'-methylenedianiline, oxydianiline, 4,4'-sulfonydianiline, methylene-bis-o-chloroaniline, and 2,4-toluenediamine.

6. A process as defined in claim 1, wherein said polyamine is 4,4'-methylenedianiline, and said phosphorus amide is hexamethylphosphoramide.

7. A process as defined in claim 1, said reaction being carried out in a solvent selected from the group consisting of quinoline, diphenyl ether and N-methylpyrrolidone.

8. The process for producing a hydrolytically stable organophosphorus-nitrogen polymer, which comprises heating at substantially reflux temperature a polyamine having the formula $$H_2N-B-NH_2$$

where B is a member selected from the group consisting of arylene and alkylene groups, said alkylene groups each containing from 2 to about 6 carbon atoms, and an organic phosphorus amide, said phosphorus amide being selected from the group consisting of hexamethylphosphoramide and hexaethylphosphoramide, employing a molar ratio of said phosphorus amide to said polyamine ranging from about 1 to 1 to about 20 to 1, for a period sufficient to cause gelling or solidification of the reaction mixture, said reaction mixture being maintained at a temperature ranging from about 190 to about 300° C., for a period from about ½ hour to about 72 hours, and recovering a polymeric product from said reaction mixture.

9. A polymeric product having the formula

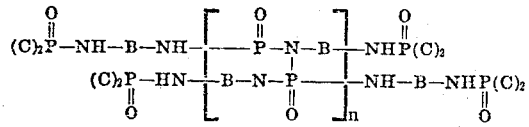

where B is a member selected from the group consisting of arylene and alkylene groups containing from 2 to about 6 carbon atoms, C is a member selected from the class consisting of $(NH_2)_xB-NH-$ and $RR'N-$ groups, where $x$ is an integer of from 1 to 2, and R and R' are each a lower alkyl group of from 1 to about 6 carbon atoms, said polymer containing a mixture of said C end groups $(NH_2)_xB-NH-$ and $RR'N-$, and $n$ is an integer from 2 to about 100.

10. A polymeric product as defined in claim 9, where B is arylene and $x$ is 1.

11. A product consisting of a mixture of polymeric products as defined in claim 9.

12. A polymeric product as defined in claim 9, where $x$ is 1, and B is a member selected from the group consisting of

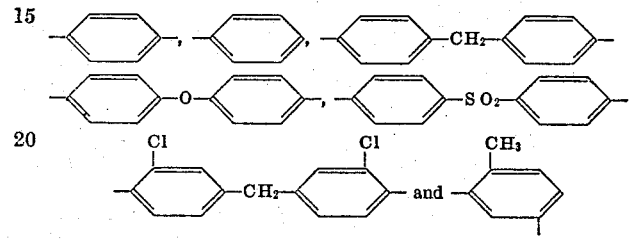

groups.

13. A polymeric product as defined in claim 12, wherein R and R' are each an alkyl group containing from 1 to 2 carbon atoms.

14. A polymeric product as defined in claim 9, where B is phenylene and $x$ is 1, and wherein R and R' are each a methyl group, and including a mixture of polymers wherein $n$ ranges from about 11 to about 13, said last mentioned polymers being substantially soluble in N,N-dimethylformamide, and polymers wherein $n$ ranges from about 18 to about 20, said last mentioned polymers being substantially insoluble in N,N-dimethylformamide.

15. An element comprising a fibrous material impregnated with a polymeric product as defined in claim 9.

16. An element comprising a fibrous material impregnated with a polymeric product as defined in claim 13.

17. An element as defined in claim 16, wherein said fibrous material is fiber glass.

18. A plastic molding composition comprising a polymeric product as defined in claim 9, in particulate form.

19. A plastic molding composition comprising a polymeric product as defined in claim 13, in particulate form.

References Cited

UNITED STATES PATENTS

| | | | |
|---|---|---|---|
| 3,029,283 | 4/1962 | Steinhauer | 260—551 |
| 3,116,268 | 12/1963 | Farago | 260—2 |
| 3,244,647 | 4/1966 | Greenley et al. | 260—2 |
| 3,377,409 | 4/1968 | McConnell et al. | 260—2 |

FOREIGN PATENTS 929,221   6/1963   Great Britain.

OTHER REFERENCES

Goehring, German application 1,011,859, printed July 1957.

Korshak et al., "Izvestia Akad. Nauk SSSR," 1962, pp. 1412–16, supplied as 58 Chem. Abstracts 2469.

Parts et al., "Inorganic Chemistry," vol. 3, No. 9, September 1964, pp. 1261–1267.

SAMUEL H. BLECH, Primary Examiner

U.S. Cl. X.R.

117—161; 156—331; 161—191; 260—30.2, 30.6, 30.8, 32.6, 32.8, 33.2, 47, 79, 79.3, 551